(12) United States Patent
Bodum

(10) Patent No.: US 10,687,640 B2
(45) Date of Patent: Jun. 23, 2020

(54) DOUBLE-WALLED VESSEL FOR STORING A POTABLE LIQUID

(71) Applicant: Pi-Design AG, Triengen (CH)

(72) Inventor: Joergen Bodum, Meggen (CH)

(73) Assignee: Pi-Design AG, Triengen (CH)

( * ) Notice: Subject to any disclaimer, the term of this patent is extended or adjusted under 35 U.S.C. 154(b) by 0 days.

(21) Appl. No.: 16/098,519

(22) PCT Filed: May 3, 2017

(86) PCT No.: PCT/EP2017/060529
§ 371 (c)(1),
(2) Date: Nov. 2, 2018

(87) PCT Pub. No.: WO2017/191185
PCT Pub. Date: Nov. 9, 2017

(65) Prior Publication Data
US 2019/0142189 A1    May 16, 2019

(30) Foreign Application Priority Data
May 3, 2016 (DE) .................. 10 2016 108 242

(51) Int. Cl.
*A47G 19/12* (2006.01)
*A47J 41/00* (2006.01)
*B65D 81/38* (2006.01)

(52) U.S. Cl.
CPC ........ *A47G 19/127* (2013.01); *A47J 41/0077* (2013.01); *B65D 81/3869* (2013.01)

(58) Field of Classification Search
CPC ... A47G 19/00–127; B65D 81/00–3869; A47J 41/00–0077
See application file for complete search history.

(56) References Cited

U.S. PATENT DOCUMENTS

| | | | | |
|---|---|---|---|---|
| 877,675 A | * | 1/1908 | Raiser | A21C 13/00 |
| | | | | 126/281 |
| 2,376,064 A | * | 5/1945 | Knapp | B65D 23/0885 |
| | | | | 215/13.1 |

(Continued)

FOREIGN PATENT DOCUMENTS

| DE | 453809 C | 12/1927 |
|---|---|---|
| DE | 718821 C | 3/1942 |

(Continued)

OTHER PUBLICATIONS

Office Action dated May 20, 2016 in DE Application No. 1020161082422.

(Continued)

*Primary Examiner* — Kareen K Thomas
(74) *Attorney, Agent, or Firm* — Panitch Schwarze Belisario & Nadel LLP

(57) ABSTRACT

The present invention relates to a double-walled vessel for storing a potable liquid, particularly a hot drink such as coffee, comprising an inner container (12) that encloses a cavity (34) for receiving the liquid and that forms at least one support surface (46), and an outer container (14) which comprises at least two shells (16, 18) that are detachably interconnectable, wherein the outer container (14) at least partially encloses the inner container (12) when in the connected state, and is supported against the support surface (46) when in the connected state.

12 Claims, 3 Drawing Sheets

(56) References Cited

U.S. PATENT DOCUMENTS

| | | | | |
|---|---|---|---|---|
| 2,818,990 A | | 1/1958 | Sommerfeld | |
| 3,337,073 A | | 8/1967 | Angelo | |
| 3,476,277 A | * | 11/1969 | Rownd | A47J 41/02 215/12.1 |
| 4,560,075 A | | 12/1985 | Lu | |
| 5,037,002 A | * | 8/1991 | Tschanen | B65D 33/02 220/4.24 |
| 5,168,793 A | * | 12/1992 | Padamsee | A47J 31/0573 215/12.1 |
| 5,515,995 A | * | 5/1996 | Allen | A47G 19/2261 215/13.1 |
| 5,579,946 A | * | 12/1996 | Rowan | A47G 23/04 220/592.27 |
| 5,678,725 A | * | 10/1997 | Yamada | A47J 41/0077 220/592.21 |
| 5,769,262 A | * | 6/1998 | Yamada | A47J 41/0077 220/592.17 |
| 5,823,391 A | * | 10/1998 | Klauke | B65D 35/22 222/94 |
| 5,968,618 A | * | 10/1999 | Miller | A47G 19/127 215/13.1 |
| 6,179,155 B1 | * | 1/2001 | Komiya | A47J 41/0072 220/592.11 |
| 6,976,600 B2 | * | 12/2005 | Yoneyama | B65D 1/0215 215/12.1 |
| 10,085,597 B2 | * | 10/2018 | Bodum | A47J 41/0077 |
| 2001/0032853 A1 | * | 10/2001 | Kuehn | B29C 49/22 220/495.03 |
| 2015/0284143 A1 | * | 10/2015 | Herisson | B05B 11/0008 220/4.24 |

FOREIGN PATENT DOCUMENTS

| | | |
|---|---|---|
| DE | 1850137 U | 4/1962 |
| DE | 202008012296 U1 | 2/2009 |
| JP | 2009137607 A | 6/2009 |
| KR | 20201200002101 U | 12/2012 |

OTHER PUBLICATIONS

Int'l Search Report dated Aug. 2, 2017 in Int'l Application No. PCT/EP2017/060529.

* cited by examiner

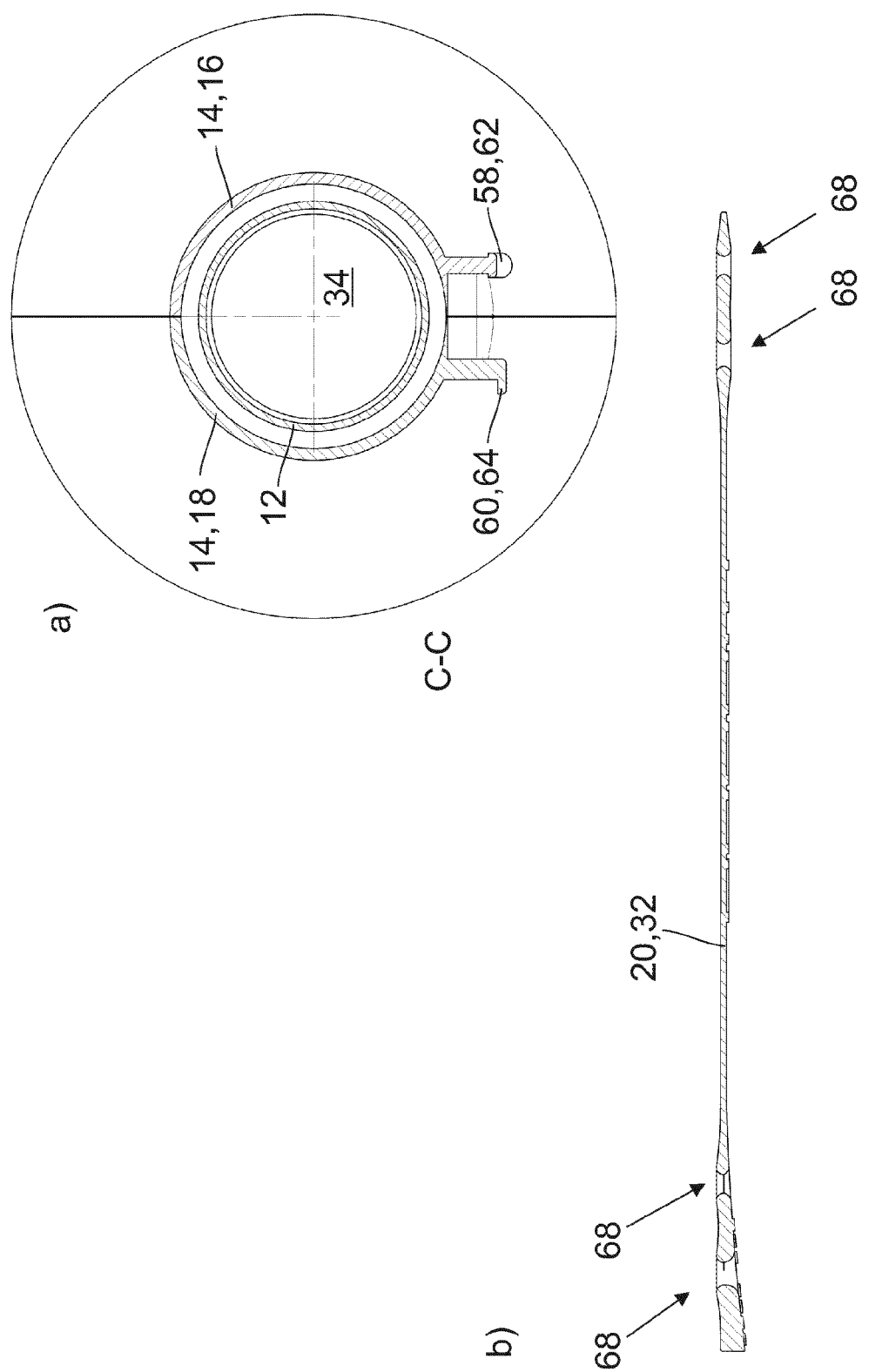

DOUBLE-WALLED VESSEL FOR STORING A POTABLE LIQUID

CROSS-REFERENCE TO RELATED APPLICATIONS

This application is a Section 371 of International Patent Application No. PCT/EP2017/060529, filed May 3, 2017, which was published in the German language on Nov. 9, 2017 under International Publication No. WO 2017/191185 A1, which claims priority under 35 U.S.C. § 119(b) to German Patent Application No. 10 2016 108 242.2, which was filed May 3, 2016, the entirety of the aforementioned applications are incorporated herein by reference in their entirety.

BACKGROUND OF THE INVENTION

The present invention relates to a double-walled vessel for storing a potable liquid.

Double-walled vessels are often used for storing potable liquids, especially for the following reasons: on one hand, increased insulation relative to single-walled vessels can be provided, so that hot drinks stay hot and cold drinks stay cold longer. On the other hand, gripping the double-walled vessels is more comfortable for the user, because the temperature of the beverage is transferred to the user's hand only to a comparatively lower degree, so that the user can grip the vessel without burning or freezing his or her hand. Due to the latter property, double-walled vessels are often designed as drinking vessels that not only store the hot or cold beverage, but also allow drinking directly from the vessel.

Such a double-walled drinking vessel is known, for example, from DE 10 2013 114 552 A1, in which an essentially hollow cylindrical outer container can be pushed onto a similarly essentially hollow cylindrical inner container. The outer container has an elastic connecting piece that engages in a recess of the inner container, in order to fasten the outer container onto the inner container in an essentially positive-locking connection. The pushing and fastening procedures are possible, however, only if the inner container has a certain shape, for example, an essentially hollow cylindrical shape or a conical shape expanding from the base of the inner container.

DE 18 50 137 U shows a double-walled vessel with an inner container and an outer container. The outer container has two parts, of which one part is designed as a threaded cover and can be screwed onto the other part.

DE 453 809 A shows a double-walled vessel with an inner and an outer container. Specifically, the inner container is a teapot that can be insulated with the outer container. The outer container has two parts, which can be separated from each other, in order to detach the teapot from the outer container.

Other double-walled vessels are disclosed in DE 718 821 A and DE 10 2008 012 296 U1.

The problem of one embodiment of the present invention is to disclose a double-walled vessel for storing a potable liquid, especially a hot drink such as coffee, with an inner container and an outer container, in which the outer container can be fastened to the inner container essentially independent of the shape of this inner container.

This problem is solved with the features specified in claim 1. Advantageous embodiments are the subject matter of the subordinate claims.

BRIEF SUMMARY OF THE INVENTION

One embodiment of the invention relates to a double-walled vessel for storing a potable liquid, particularly a hot drink such as coffee, comprising an inner container that encloses a cavity for storing the liquid and that forms at least one support surface, and an outer container that comprises at least two shells that are detachably interconnectable, wherein the outer container at least partially encloses the inner container in the connected state and is supported on the support surface in the connected state.

In the scope of this description, the shells are understood to be flat, bent, and/or curved bodies. Therefore, because the outer container comprises at least two shells that are detachably interconnectable, it is possible to construct the inner container as a curved body, for example, spherical, which is not possible or is possible only under certain conditions, for example, in the drinking vessel shown in DE 10 2013 114 552 A1. The outer container can here have a shape that more or less corresponds to the shape of the inner container. In principle, however, the shape of the inner container can be selected essentially independently from the shape of the outer container. However, in order to define the position of the outer container relative to the inner container in the connected state of the outer container, the outer container is supported, in the connected state, on the support surface which is formed by the inner container and particularly from its end face or outer surface. Here, in a strictly mathematical sense, the contact can also be a linear contact, so that there would not be a surface. In practice, however, there is always a support surface. In the connected state, the outer container contacts the inner container in the support surface, so that this arrangement positions the outer container. Consequently, the outer container can no longer be moved arbitrarily relative to the inner container, which significantly simplifies the use of the double-walled vessel.

Because the shells are detachably interconnectable, they can be easily detached from the first container, for example, to be cleaned. After the cleaning has been completed, the shells can be connected to the inner container again with a few manual manipulations. Due to the simple detachability of the outer container from the inner container, thorough cleaning is possible, especially cleaning of the entire outer surface of the inner container and the inner surfaces of the shells. In particular, it is possible to form the at least two shells so that they can be connected to each other by means of a friction-locking connection. In this case, other components for connecting the shells to each other are no longer required. For this purpose, the two shells can comprise projections and recesses that correspond to each other and have a slight allowance for interference relative to each other. When the projections are inserted into the recesses, a friction-locking connection is created that connects the shells to each other.

According to the specifications of another embodiment, the inner container defines a longitudinal axis and the support surface is formed by a section of the inner container inclined relative to the longitudinal axis. As already mentioned above, the inner container can have a spherical shape, so that it already has a section that is inclined with reference to the longitudinal axis. The support surface is consequently formed by the outer surface of the inner container that can have, for example, a convexly or concavely curved or flat shape. It is not necessary to use special measures to provide the support surface. Instead, the outer container and particularly the shells that can be connected are shaped so that commercially available inner containers can also be used. In this respect, it is possible to retrofit already existing inner containers with the outer container. Special measures or changes to the inner container are not required, so that the inner container can be retrofitted relatively easily.

In one improved embodiment, the inner container can have an opening for filling the liquid into the cavity and for pouring the liquid out of the cavity, wherein, starting from the opening and with reference to the longitudinal axis, the inner container has an expanding section, on which the support surface is arranged. Commercially available inner containers that are used for storing a potable liquid typically have an expanding, convexly curved section, often spherical shapes or spherical segment shapes, as is the case particularly for teapots and coffee pots. In this respect, it is not necessary for providing the vessel according to the proposal to provide the inner container with a shape that deviates from the typical wealth of shapes. Thus, the double-walled drinking vessel according to the proposal is implemented in an especially simple way.

In one improved embodiment, expanding section can be a part of a convexly curved section of the inner container or can transition into the convexly curved section. The concept according to the proposal is also expressed in this embodiment to not be dependent on a certain shape of the inner container, as long as there is an expanding section. However, because, as already mentioned above, inner containers that are at least partially convexly curved are typically used for vessels for storing drinks, these inner containers can be used with the outer containers according to the proposal without extensive structural changes.

In another embodiment, starting from the opening and with respect to the longitudinal axis, the inner container can have a tapering section that connects to the expanding section. The tapering section can have, for example, a conical shape, so that the tapering section is suitable, in particular, for holding a coffee filter. In this arrangement, it is not necessary to use a separate attachment for a coffee filter, which has the advantage, in particular, that the attachment does not have to be purchased separately and also cannot be lost or misplaced. The inner container forms a neck in the area of the transition from the tapering section into the expanding section.

An improved embodiment is distinguished in that the inner container forms at least one contact surface that contacts the outer container in the connected state. For the contact surface, it also applies that this could be a line, in a strictly mathematical sense, which, however, is formed in reality as a surface. Thus, if the inner container forms both the contact surface and also the support surface, which are spatially separated from each other, the outer container comes into contact with the inner container in two surfaces in the connected state. In this respect, the positioning of the outer container with respect to the inner container is clearly defined. This applies especially if the contact surface is formed by the tapering section and the support surface is formed by the expanding section of the inner container, whereby the support surface and the contact surface lie on opposite sides of the neck and are inclined in the opposite sense relative to each other. Consequently, the outer container can no longer be shifted or can be shifted only within the range of the tolerances along the longitudinal axis relative to the inner container.

According to the specifications of another embodiment, the outer container has a first seal with which the outer container is supported on the support surface. Here, the first seal can comprise an elastic sealing element that protects the inner container from damage due to contact with the outer container. In particular, scratches are avoided. Due to the elasticity of the sealing element, the outer container can be designed so that the sealing element is somewhat compressed and thus pre-tensioned in the connected state. In this way, the outer container is pressed against the contact surface, so that the outer container is clearly positioned with respect to the inner container, without having to take into account particularly strict tolerances.

Another embodiment is characterized in that the outer container encloses the inner container in the connected state so that an intermediate space is formed between the inner container and the outer container. Providing an intermediate space between the outer and the inner container has the following effects: Neither the outer nor the inner containers must be provided with particular tolerances, because deviations can be compensated by means of the intermediate space. Furthermore, the intermediate space acts as addition insulation, because the air in the intermediate space can be exchanged with surrounding air only to a relatively low degree and stationary air also has an insulating effect.

In another embodiment, the first seal can seal the intermediate space. In this embodiment, the first seal seals the intermediate space such that the exchange of air located in the intermediate space with the surrounding air is further reduced and thus the insulating effect is increased. It is further provided that shaking or dropping the vessel causes the potable liquid to run into the intermediate space.

For another embodiment, the outer container has a second seal that seals the at least two shells relative to each other in the connected state. The outer container defines a longitudinal axis. The second seal can here lie partially or completely in one plane that runs through the longitudinal axis. In this way, the insulating effect of the outer container is also increased, because the air in the intermediate space cannot escape via the contact surfaces that connect the two shells to each other in the connected state, as long as the second seal is completely functional.

It can be provided that the outer container has a fixing device for fixing the at least two shells in the connected state. The fixing device can have, for example, a locking lever with which the shells can be connected to each other. In this way, the shells can be connected to each other and disconnected from each other again in a reliable way. Uncontrolled detachment of the shells from each other is prevented.

An improved embodiment is characterized in that the fixing device comprises an elastic band that can be connected to the at least two shells. The elastic band is simple in production and use and can also be replaced easily and cost-effectively for the case that it rips or is no longer functional for other reasons. The elastic band can be wrapped, for example, once around the shells and fixed by means of a hook-and-loop fastener. Alternatively or additionally, pins can be used that engage in correspondingly dimensioned cut-outs of the elastic band, in order to fix the elastic band in place.

For another embodiment, the fixing device has a latching connection for the detachable connection of the at least two shells. The latching connection is simple to produce, reliable, and easy to handle for the user. The user only has to place the two shells around the outer container and press them together, whereby the two shells are connected to each other. To disconnect the shells, this procedure is performed in reverse accordingly.

According to specifications of another embodiment, the inner container is made from glass and the outer container is made from plastic. The inert character of glass is particularly well suited to the storage of potable liquids, because it can be almost completely ruled out that substances that might negatively affect the taste or the healthful or pleasant characteristics migrate from the glass into the potable liquid. Because glass is easy to clean, it is also prevented that residue of the potable liquid remains permanently in the inner container. However, special designs, for example, for constructing the latching connection, can be produced with glass only with a considerable expense, wherein the adherence to tolerances also presents special difficulties in the use of glass. For this purpose, the use of plastic as the material for the outer container and, in particular, in the preparation of the shells, is particularly well suited. For example, providing grooves for holding the seals presents no special problem for the use of plastic. More complex shapes, which might be nearly impossible with glass, can also be produced with plastic in a relatively simple way. In this respect, the advantages of glass for storing the drink can be combined with the good shaping properties of the plastic for providing the double-walled vessel. For the glass, for example, borosilicate glass or soda-lime-silica glass (soda-lime glass) can be used. Suitable plastics are styrene-acrylonitrile (SAN) or Tritan copolyester.

BRIEF DESCRIPTION OF THE SEVERAL VIEWS OF THE DRAWINGS

Example embodiments of the invention will be explained below with reference to the attached drawings. Shown are FIG. 1a) a sectional view through an embodiment of a double-walled vessel according to the invention, FIG. 1b) an enlarged representation of the detail X marked in FIG. 1a), FIG. 1c) an enlarged representation of the detail W marked in FIG. 1a), FIG. 2a) a side view of the embodiment of the double-walled vessel according to the invention, FIG. 2b) a sectional view along the section plane B-B defined in FIG. 2a), FIG. 2c) an enlarged representation of the detail Z marked in FIG. 2b), FIG. 3a) a sectional view along the section plane C-C defined in FIG. 2a), and FIG. 3b) a sectional view of the elastic band.

DETAILED DESCRIPTION OF THE INVENTION

Figure 1:
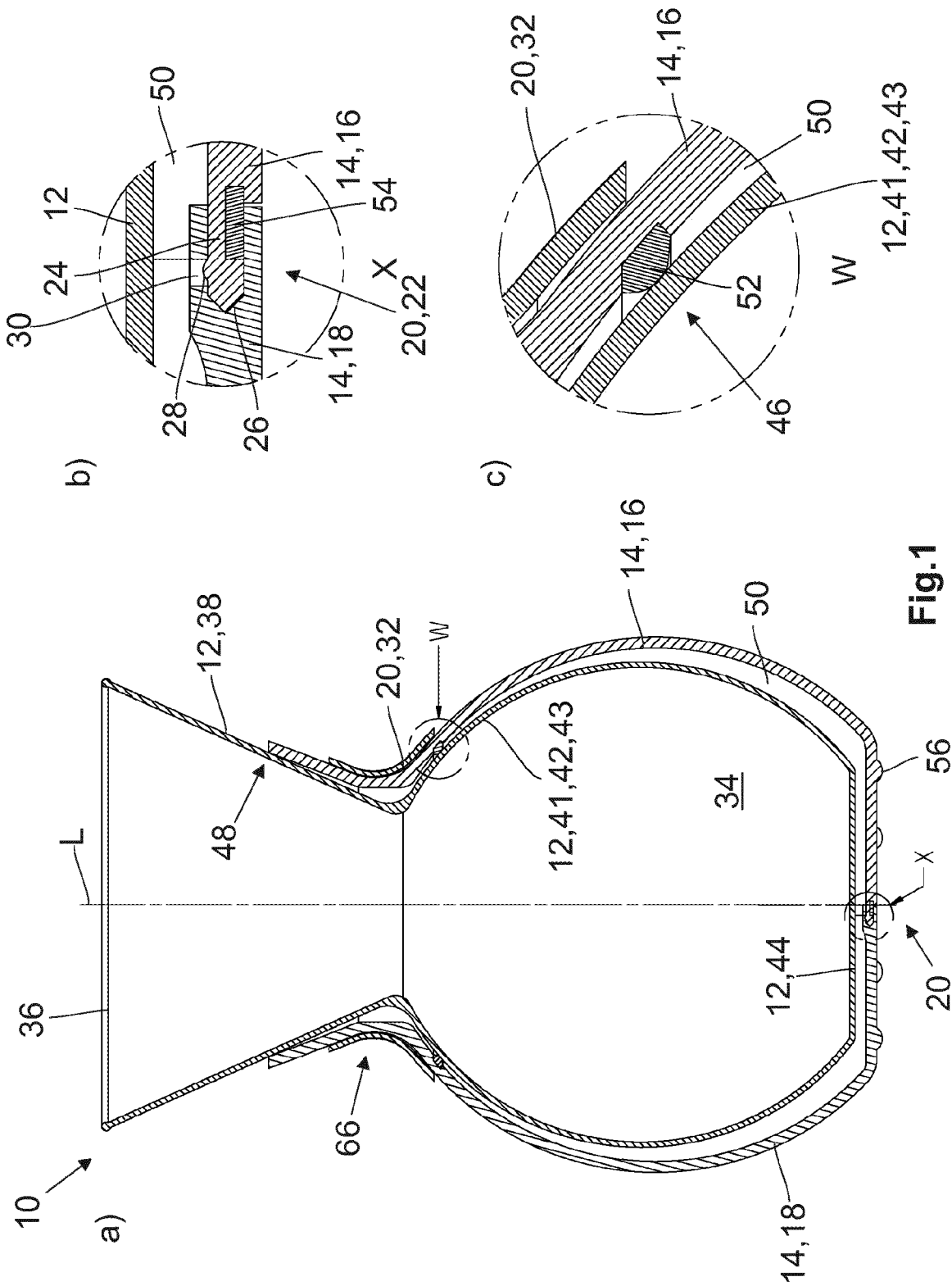

In FIG. 1a), an embodiment of a double-walled vessel according to the invention 10 is shown with reference to a sectional view. The vessel 10 has an inner container 12 and an outer container 14. In the shown embodiment, the inner container 12 is made from glass, while the outer container 14 is made from plastic. In the shown embodiment, the outer container 14 comprises a first shell 16 and a second shell 18 that are detachably interconnectable. For this purpose, the double-walled vessel 10 has a fixing device 20 that comprises a latching connection 22. As can be seen particularly from FIG. 1b), the first shell 16 has a projection 24 that engages in a correspondingly shaped recess 26 of the second shell 18. In addition, the projection 24 has a raised section 28 that engages in a hole 30 or groove of the recess 26, whereby a positive-locking connection is produced.

The fixing device 20 further comprises an elastic band 32 that wraps around the first and second shells 16, 18 in the connected state of these two shells and can be fastened to these shells, which will be discussed in more detail below.

The inner container 12 encloses a cavity 34 that defines a longitudinal axis L and in which a potable liquid, for example, coffee or tea, can be put into the cavity 34 and can be poured out of this cavity again via an opening 36. The inner container 12 has, starting from the opening 36 and viewed along the longitudinal axis L, a tapering section 38 that has a conical shape in the shown embodiment. The tapering section 38 forms, in the area of the opening 36, a spout 40 with which the potable liquid can be transferred in a controlled way, for example, into a cup (see FIG. 2b)). The tapering section can also be used for holding a coffee filter, so that the coffee can be prepared directly with the double-walled vessel.

An expanding section 42 that is convexly curved and thus forms a convexly curved section 41 connects to the tapering section 38. Due to the convex curvature, a section 43 that is inclined with respect to the longitudinal axis L is formed. Starting from a certain point, the diameter of the expanding section 42 no longer increases, but instead decreases again and transitions into a flat base area 44, so that the inner container 12 also has an approximately spherical section or spherical segment shaped section next to the conical section. On the outer surface, the inner container 12 forms, on the expanding section 42, a support surface 46 (see FIG. 1c)), on which the outer container 14 is supported in the connected state. The inner container 12 also forms, on its tapering section 38, a contact surface 48, on which the outer container 14 contacts the inner container 12 in the connected state. Here, the contact surface 48 and the support surface 46 are arranged and oriented so that they clearly define the position of the outer container 14 relative to the inner container 12. When the outer container 14 encloses the inner container 12 in the connected state, it can no longer move relative to the inner container 12.

The shape of the outer container 14 approximately corresponds to the shape of the inner container 12, so that the outer container 14 also has a conical section and a spherical section.

As emerges, in particular, from FIG. 1a), an intermediate space 50 is formed between the inner and the outer container 12, 14, when the outer container 14 encloses the inner container 12 as shown in the closed state. From FIG. 1c) it emerges that the outer container 14 has a first seal 52 with which the outer container 14 is in contact with the inner container 12 in the area of the support surface 46. From FIG. 1b) it can be seen that the outer container 14 further has a second seal 54 with which the first shell 16 is sealed relative to the second shell 18. The second seal 54 projects over its entire length into a plane that runs along the longitudinal axis L. In this way, it is achieved that the air that is located in the part of the intermediate space 50 sealed by the first seal 52 cannot escape into the surroundings, as long as the first seal 52 is completely functional. In this way, an especially effective insulation of the first container 12 is achieved, so that the temperature of the drink stored in the cavity 34 of the first container 12 changes only very slowly to the temperature of the surroundings.

On the bottom, the outer container 14 has a number of feet 56 with which the vessel 10 can be placed securely on a support base.

Figure 2:
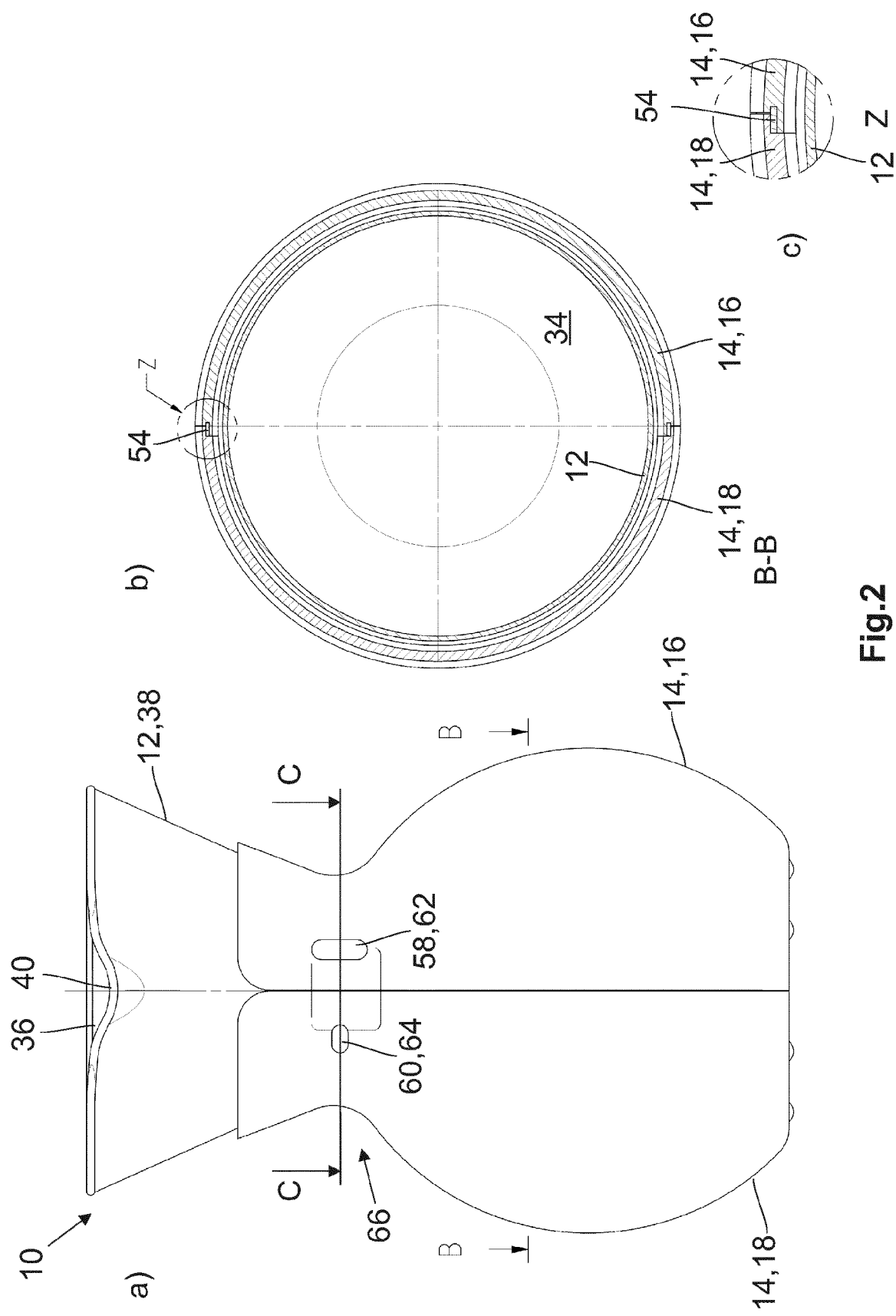

In FIG. 2a), a side view of the embodiment of the double-walled vessel 10 shown in FIG. 1 is shown. It can be seen that the first shell 16 has a first pin 58 and the second shell 18 has a second pin 60, wherein the first pin 58 has a first pin section 62 that extends essentially vertically with respect to the representation selected in FIG. 2a) and the second pin 60 has a second pin section 64 that extends essentially horizontally. The pins 58, 60 are arranged in the area in which the conical section transitions into the spherical section, where both the inner container 12 and also the outer container 14 form a neck 66.

From FIGS. 2b) and 2c) it can be seen that the second seal 54 is not only on the base, as shown in FIG. 1b), but also runs vertically, so that the second seal 54 runs along the entire contact surface on which the first shell 16 is in contact with the second shell 18 in the connected state.

In FIG. 3b) it can be seen that the elastic band 32 has, at each of its two ends, two cut-outs 68 that can be slipped onto the first pin 58 and the second pin 60. The cut-outs 68 are shaped so that they correspond to the orientations of the first pin section 62 and the second pin section 64 shown in FIG. 2a). In this way it is achieved that the elastic band 32 can be slipped onto the two pins 62, 64 in only one orientation.

For connecting the first shell 16 to the second shell 18, these are positioned around the first container 12 and moved relative to each other until the projection 24 of the first shell 16 engages in a positive-locking connection in the recess 26 of the second shell 18. The latching connection 22 can be constructed so that the user receives clear feedback when the two shells 16, 18 are connected to each other. Then the elastic band 32 is placed with one end on the two pins 58, 60, wrapped once around the two shells and then pushed with the other end on the two pins 58, 60. In this way, the two shells 16, 18 are connected to each other not only by means of their latching connection 22, but also by means of the elastic band 32.

As already explained above, the pins 58, 60 are arranged in the area, in which the conical section transitions into the spherical area. As already mentioned, the inner container 12 and the outer container 14 form the neck 66 in this area. Due to the arrangement of the pins 58, 60, the elastic band 32 runs along the neck 66 of the outer container 14, whereby slippage of the elastic band 32 is prevented. Slippage is also avoided in that the elastic band 32 must be put in tension when wrapping around the two shells 16, 18, because the distance between the cut-outs 68 is smaller than the circumference of the neck 66.

To detach the outer container 14 from the inner container 12, the elastic band 32 is removed from the pins 58, 60 and consequently from the outer container 14 and the two shells 16, 18 are pulled apart from each other. The detachment is provided so that, in particular, the vessel 10 can be cleaned.

LIST OF REFERENCE SYMBOLS

10 Vessel
12 Inner container
14 Outer container
16 First shell
18 Second shell
20 Fixing device
22 Latching connection
24 Projection
26 Recess
28 Raised section
30 Hole
32 Elastic band
34 Cavity
36 Opening
38 Tapering section
40 Spout
41 Convexly curved section
42 Expanding section
43 Inclined section
44 Base area
46 Support surface
48 Contact surface
50 Intermediate space
52 First seal
54 Second seal
56 Feet
58 First pin
60 Second pin
62 First pin section
64 Second pin section
66 Neck
68 Cut-out
L Longitudinal axis

The invention claimed is:

1. A double-walled vessel for storing a potable liquid, particularly a hot drink such as coffee, the double-walled vessel comprising:
    an inner container (12) that encloses a cavity (34) for receiving the liquid and that forms at least one support surface (46), and
    an outer container (14) which comprises at least two shells (16, 18) that are detachably interconnectable, wherein the outer container (14) at least partially encloses the inner container (12) when in a connected state and is supported against the at least one support surface (46) when in the connected state,
    wherein the outer container (14) has a fixing device (20) for fixing the at least two shells (16, 18) in the connected state and the fixing device (20) has a latching connection (22) for detachable connection of the at least two shells (16, 18).

2. The double-walled vessel according to claim 1, wherein the inner container (12) defines a longitudinal axis (L) and the support surface (46) is formed by a section (43) of the inner container (12) inclined relative to the longitudinal axis (L).

3. The double-walled vessel according to claim 2, wherein the inner container (12) has an opening (36) for filling the liquid into the cavity (34) and for pouring the liquid out of the cavity (34), wherein, starting from the opening (36) and with respect to the longitudinal axis (L), the inner container (12) has an expanding section (42) on which the support surface (46) is arranged.

4. The double-walled vessel according to claim 3, wherein the expanding section (42) is part of a convexly curved section (41) of the inner container (12) or transitions into the convexly curved section (41).

5. The double-walled vessel according to claim 3, wherein, starting from the opening (36) and with respect to the longitudinal axis (L), the inner container (12) has a tapering section (38) that connects to the expanding section (42).

6. The double-walled vessel according to claim 1, wherein the inner container (12) forms at least one contact surface (48) that contacts the outer container (14) in the connected state.

7. The double-walled vessel according to claim 1, wherein the outer container (14) has a first seal (52) with which the outer container (14) is supported on the support surface (46).

8. The double-walled vessel according to claim 1, wherein the outer container (14) encloses the inner container (12) in the connected state so that an intermediate space (50) is formed between the inner container (12) and the outer container (14).

9. The double-walled vessel according to claim 8, wherein a first seal (52) seals the intermediate space (50).

10. The double-walled vessel according to claim 1, wherein the outer container (14) has a second seal (54) that seals the at least two shells (16, 18) in the connected state.

11. The double-walled vessel according to claim 1, wherein the inner container (12) is made from glass and the outer container (14) is made from plastic.

12. A double-walled vessel for storing a potable liquid, particularly a hot drink such as coffee, the double-walled vessel comprising:
- an inner container (12) that encloses a cavity (34) for receiving the liquid and that forms at least one support surface (46), and
- an outer container (14) which comprises at least two shells (16, 18) that are detachably interconnectable, wherein the outer container (14) at least partially encloses the inner container (12) when in a connected state and is supported against the at least one support surface (46) when in the connected state,
- wherein the outer container (14) has a fixing device (20) for fixing the at least two shells (16, 18) in the connected state and the fixing device (20) comprises an elastic band (32) that can be connected to the at least two shells (16, 18).

\* \* \* \* \*